3,733,364
5-CHLORO-2-ETHYNYLBENZYL METHYL
SULFOXIDE AND ITS PREPARATION
Joseph Albert Meschino, Doylestown, and James Nelson
Plampin, Roslyn, Pa., assignors to McNeil Laboratories, Inc.
No Drawing. Filed Feb. 25, 1971, Ser. No. 118,977
Int. Cl. C07c 147/02
U.S. Cl. 260—607 A        3 Claims

ABSTRACT OF THE DISCLOSURE

Preparation of (i) 5-chloro-2-ethynylbenzyl methyl sulfoxide, useful for its muscle relaxant activity, by the reaction of methylsulfinyl carbanion with p-chlorobenzotrifluoride, and (ii) 2-methyl-sulfonylmethyl-4-chlorobenzoic acid by the oxidation of (i).

---

This invention relates to the novel compounds, 5-chloro-2-ethynylbenzyl methyl sulfoxide (I) and 2-methylsulfonylmethyl-4-chlorobenzoic acid (II):

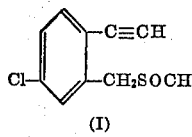   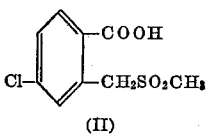

(I)                (II)

According to this invention, 5-chloro-2-ethynylbenzyl methyl sulfoxide (I) is obtained by the reaction of p-chlorobenzotrifluoride (III) with methylsulfinyl carbanion (IV), preferably utilizing a stoichiometric excess of (IV) in a suitable aprotic organic solvent. The reaction is preferably conducted in an inert atmosphere, for example, under nitrogen, argon and the like, although such an atmosphere is not critical and the reaction may be conducted in normal atmospheric oxygen. Typical examples of solvents that may be employed are tetrahydrofuran (THF), ether, dioxane, aromatic hydrocarbons and the like. The reaction is performed in the cold, preferably at temperatures from about −10° C. to about 10° C. The methylsulfinyl carbanion is obtained from any source capable of yielding the carbanion in situ, for example, the corresponding alkali metal salt such as sodium methylsulfinyl, which may be prepared from the interaction of sodium hydride and dimethyl sulfoxide. The reaction may be illustrated by the following reaction scheme:

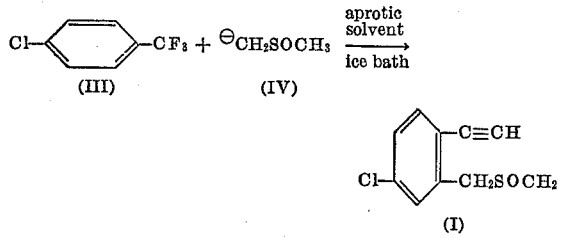

The reaction between (III) and (IV) is very exothermic, and, consequently, it is recommended that the addition of one to the other be carried out slowly. Otherwise, violent eruption may occur. After the addition is complete, the reaction mixture is stirred for about 1–2 hours and then brought to room temperature. The product (I) is then isolated by conventional techniques.

The foregoing reaction is deemed to be novel and quite unexpected. According to the literature [see E. J. Corey and M. Chaykovsky, J. Am. Chem. Soc., 87, 1345 (1965)], chlorobenzene reacts with methylsulfinyl carbanion to give methylbenzyl sulfoxide. It was thus expected that the reaction of p-chlorobenzotrifluoride with methylsulfinyl carbanion would yield the corresponding trifluoromethyl derivative. However, as described herein, the actual product of the latter reaction is 5-chloro-2-ethynylbenzyl methyl sulfoxide (I).

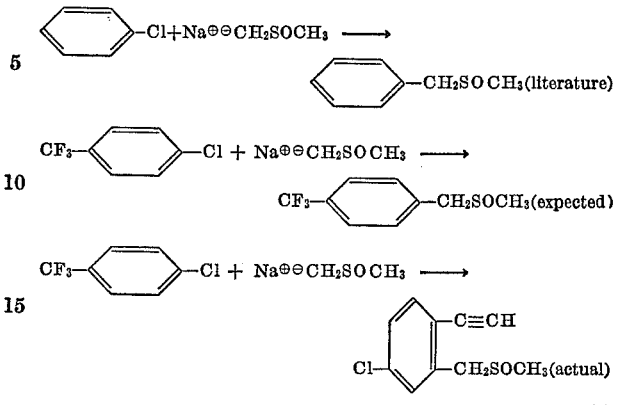

(I)

Elemental analysis of (I) gave the empirical formula $C_{10}H_9ClOS$. A rigorous determination of the actual structure of (I) could not be deduced, however, by the usual procedures, such as infrared, NMR and elemental analyses. These methods merely indicated that the said product of the reaction was an isomer of the structure:

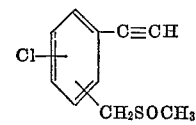

Rigorous structural assignment was achieved finally through the use of an oxidation product of (I). For example, oxidation with potassium permanganate gave a carboxylic acid sulfone:

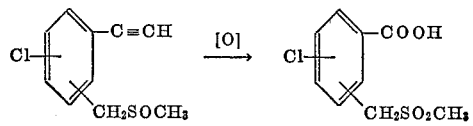

whose ultraviolet and NMR spectra were then compared to those of 4-chlorotoluic acid:

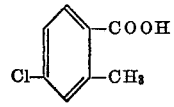

and 5-chlorotoluic acid:

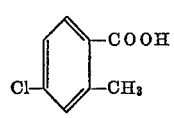

By ultraviolet and NMR comparisons, excellent correlation was found between the carboxylic acid sulfone oxidation product and 4-chlorotoluic acid so that the former was identified as 2-methylsulfonylmethyl-4-chlorobenzoic acid (II), from which the proof of structure of (I) was clearly evident. The acid product (II), therefore, is not only a novel entity but is also a very useful tool in the identification of (I).

5-chloro-2-ethynylbenzyl methyl sulfoxide (I) has been found to possess useful skeletal muscle relaxant properties. In doses of 10–300 mg./kg. administered i.p. to unanesthetized mice, the compound produces ataxia in the animals, the minimal effective dose being 10 mg./kg. i.p. The minimal effective dose of methocarbamol in this procedure is 100 mg./kg. i.p.

As a further illustration of its muscle relaxant properties, the subject compound effectively protects mice from tonic convulsions cause by administration of metrazole.

The test method is described in J. Pharmacol. Exp. Ther., 117, 142 (1956). The $ED_{50}$ for (I) is 88 mg./kg. p.o. For methocarbamol, the $ED_{50}$ is 140 mg./kg. p.o.

EXAMPLE I 5-chloro - 2 - ethynylbenzyl methyl sulfoxide.—A mixture of 28.8 g. (1.2 moles) of sodium hydride, freed from oil by washing with petroleum ether, and 156 g. (2 moles) of distilled, water-free dimethyl sulfoxide in 350 ml. of THF was stirred and refluxed until hydrogen gas evolution ceased (about 2½ hours). The mixture was cooled to −5° C., under nitrogen, in an ice bath and treated dropwise with 36 g. (0.2 mole) of p-chlorobenzotrifluoride in 25 ml. of THF. (*CAUTION*: The reaction is very exothermic, and if the addition is not carried out slowly, a violent eruption may occur.) The temperature was kept at below 8° C. during the addition. After stirring for about 2 hours, the bath was removed and the temperature allowed to reach room temperature. The reaction mixture was poured into a mixture of ice and water and extracted with benzene. The extracts were dried, treated with charcoal and the solvent was distilled in vacuo, leaving a dark oil residue which deposited a solid on trituration with ether. The solid was collected (9 g.) and recrystallized from ethyl acetate-hexane to give about 5 g. (12%) of 5-chloro-2-ethynylbenzyl methyl sulfoxide, M.P. 104–108° C. After recrystallization from ethyl acetate-hexane, the M.P. was 112–114° C., IR (BKr) 3200 (C≡C—H), 2100 cm.$^{-1}$ (C≡C—H); UV (MeOH) 237 ($\epsilon$ 14,900), 248 ($\epsilon$ 15,620), 255 nm. ($\epsilon$ 14,550); NMR (CDCl$_3$) $\delta$ ca. 7.4 (m, 3, aromatic), 4.19 (s, 2, CH$_2$—SO), 3.47 (s, 1, C≡CH), 2.52 p.p.m. (s, 3, —SOCH$_3$).

*Analysis.*—Calcd. for C$_{10}$H$_9$ClOS (percent): C, 56.47; H, 4.26; Cl, 16.67; S, 15.08. Found (percent): C, 56.35; H, 4.30; Cl, 16.63; S, 15.20.

EXAMPLE II 2-methylsulfonylmethyl-4-chlorobenzoic acid.—To a suspension of 1.1 g. (0.005 mole) of 5-chloro-2-ethynylbenzyl methyl sulfoxide in 30 ml. of water was added, with swirling and heating on a steam bath, 3.2 g. (0.02 mole) of KMnO$_4$ in several portions. After a few minutes, the mixture was cooled, filtered and acidified. The resulting precipitate was collected and washed with water to give 0.5 g. (38%) of 2-methylsulfonylmethyl-4-chlorobenzoic acid, M.P. 193–196° C. Recrystallization from absolute ethanol raised the melting point to 201–203° C., IR (KBr) 1666 cm.$^{-1}$ (C=O); UV max. (MeOH) 236 ($\epsilon$ 9660), 279 ($\epsilon$ 960), 286 nm. ($\epsilon$ 745); NMR (DMSO$_{d6}$) $\delta$ ca. 7.8 (m, 3, aromatic), 5.07 (s, 2, —CH$_2$—SO—), 2.91 p.p.m. (s, 3, —SO—CH$_3$).

*Analysis.*—Calcd. for C$_9$H$_9$ClO$_4$S (248.69) (percent): C, 43.46; H, 3.65; Cl, 14.26; S, 12.90. Found (percent): C, 43.47; H, 3.65; Cl, 14.45; S, 12.76.

We claim:
1. 5-chloro-2-ethynylbenzyl methyl sulfoxide.
2. A method of preparing 5-chloro-2-ethynylbenzyl methyl sulfoxide which comprises reacting p-chlorobenzotrifluoride with methylsulfinyl carbanion in an aprotic organic solvent at temperatures from about −10° C. about 10° C.
3. A method of preparing 5-chloro-2-ethynylbenzyl methyl sulfoxide which comprises reacting p-chlorobenzotrifluoride with methylsulfinyl carbanion in an aprotic organic solvent at temperatures from about −10° C. to about 10° C. under an inert atmosphere.

References Cited

UNITED STATES PATENTS

| | | | |
|---|---|---|---|
| 3,105,090 | 9/1963 | Leonard | 260—521 |
| 3,098,870 | 7/1963 | Schlatter | 260—515 |

JAMES A. PATTEN, Primary Examiner

U.S. Cl. X.R.

260—515 A; 424—337